United States Patent Office 2,999,853
Patented Sept. 12, 1961

2,999,853
COPOLYMERS OF N-VINYLPYRROLIDONES WITH DIALKYL MALEATES OR FUMARATES
William M. Perry, Bethlehem, Pa., assignor to General Aniline & Film Corporation, New York, N.Y., a corporation of Delaware
No Drawing. Filed Aug. 23, 1957, Ser. No. 680,027
6 Claims. (Cl. 260—78.5)

This invention relates to a new class of copolymers of N-vinylpyrrolidone with dialkyl maleates or fumarates which are water insensitive and particularly adaptable in various industrial applications as pressure sensitive adhesives.

It is known that polymeric N-vinylpyrrolidones, colorless horn- or glass-like materials with a high softening point, are soluble in either water or water-miscible organic solvents such as alcohol, ethylene glycol, etc. Aqueous or aqueous alcohol solutions of such polymers are employed as textile assistants, finishing, thickening, sticking, binding and pharmaceutical agents. Among their many applications, the polymers are finding use as additives in a host of cosmetic and pharmaceutical products as the water-soluble component. Films cast from such polymers are extremely brittle and friable when dry. While polymers of this type possess many unusual properties and applications, they have been over-shadowed by their lack of flexibility and lack of tackiness, i.e. as adhesives for polyethylene, Saran wrap, aluminum foil, etc.

It is also known that copolymers of maleic anhydride with N-vinylpyrrolidones are colorless, glass-like resinous materials which are also soluble in water and water-miscible organic solvents. In contact with water, the maleic anhydride portion of the copolymer hydrolyzes to the free acid thereby increasing its water solubility. Films cast from such copolymers are also extremely brittle and friable and unsuitable as water insensitive adhesives.

The problem of providing a suitable pressure sensitive adhesive which is not only water insoluble but also possessing flexibility and a permanent adhesion to polyethylene, polyethylene glycol terephthalate, Mylar, Saran wrap, aluminum foil, waxpaper, etc. has plagued manufacturers of these materials. If a prospective polymeric or copolymeric material is found which is water insensitive, i.e. soluble in organic solvents, it lacks permanent flexibility. Numerous resinous polymeric and copolymeric materials have been investigated with little success.

Accordingly, it is the principal object of the present invention to provide a new class of copolymeric materials which are water insoluble, soluble in organic hydrocarbons and are excellent adhesives for polyethylene, Mylar, Saran wrap, aluminum foil, waxpaper and the like.

A further object is to provide pressure sensitive adhesives which are permanently flexible.

Other objects and advantages will become manifest from the following description.

I have discovered that the foregoing objects are readily accomplished by internally plasticizing vinylpyrrolidone polymer with a dialkyl maleate or fumarate ester. The resulting polymer or copolymer contains chemically bound dialkyl maleate or fumarate ester in the ratio of 1 to 5 moles of N-vinylpyrrolidone to each mole of ester.

The copolymers or modified polymers are characterized by the following general formula:

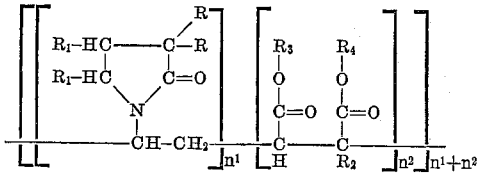

wherein R represents either hydrogen or methyl groups, $R_1$ represents either hydrogen, methyl or ethyl groups, $R_2$ represents either hydrogen or an alkyl group of 1 to 3 carbon atoms, e.g. methyl, ethyl, propyl, isopropyl, $R_3$ and $R_4$ represent an alkyl chain of from 3 to 14 carbon atoms, and $n^1+n^2$ represents a positive integer greater than 5 and wherein the ratio of $n^1/n^2$ ranges from 1 to 5.

The modified polymers are readily prepared by the ordinary polymerization techniques. From 1 to 5 moles of the monomeric N-vinylpyrrolidone and 1 mole of a dialkyl maleate or dialkyl fumarate with or without the usual solvent are charged in the usual 3-necked Pyrex vessel equipped with a reflex condenser, a gas inlet connection, a mechanical stirrer and a thermometer. The vessel is flushed with an inert gas such as nitrogen or carbon dioxide. Any type of polymerization catalyst used for polymerizing N-vinylpyrrolidone is then added. I prefer however, to employ 2,2'-azodiisobutyronitrile as the catalyst. After the addition of the catalyst, the vessel is then heated and the contents stirred for several hours until the unsaturation is dropped to an acceptable amount. This is determined by hydrogenation of a sample dissolved in hexane in the presence of a palladium catalyst on a charcoal carrier. The unsaturation is directly related to the amount of hydrogen taken up and bound by the polymer. The modified polymer is then recovered by vacuum stripping or removed from the reaction vessel and immediately employed without removal of any solvent if a solvent was employed during the addition polymerization reaction.

As specific examples of polymerizable N-vinylpyrrolidone which may be modified in accordance with the present invention, the following are illustrative:

N-vinyl-2-pyrrolidone
N-vinyl-5-methyl pyrrolidone
N-vinyl-5-ethyl pyrrolidone
N-vinyl-3,3-dimethyl pyrrolidone
N-vinyl-3-methyl pyrrolidone
N-vinyl-4-methyl pyrrolidone
N-vinyl-4-ethyl pyrrolidone As examples of dialkyl maleates and dialkyl fumarates, the following are illustrative:

*Dialkyl maleates and substituted dialkyl maleates*

α-methyl dipropyl maleate
α-methyl dibutyl maleate
α-ethyl dibutyl maleate
α-propyl dibutyl maleate
α-ethyl dioctyl maleate
α-ethyl tetradecyl maleate
Dipropyl maleate
Dibutyl maleate
Diamyl maleate Dihexyl maleate
Diheptyl maleate
Dioctyl maleate
Dinonyl maleate
Di-dodecyl maleate
Di-2-ethyl hexyl maleate
Di-tetradecyl maleate

*Dialkyl fumarates*

Dipropyl fumarate
Dibutyl fumarate
Diamyl fumarate
Dihexyl fumarate
Diheptyl fumarate
Dioctyl fumarate
Dinonyl fumarate
Di-decyl fumarate
Di-dodecyl fumarate
Di-tridecyl fumarate
Di-tetradecyl fumarate It is to be observed that the maximum dialkyl maleate or dialkyl fumarate content is 1 mole to 1 mole of N-vinylpyrrolidone. The minimum operable amount of dialkyl maleate or dialkyl fumarate to give a sticky, tacky and flexible material appears to be about 1 mole of the maleate or fumarate to 5 moles of N-vinylpyrrolidone. This is illustrated by the following calculation:

$$\frac{n^1}{n^1+n^2} = 0.5 - 0.85 \text{ by moles}$$

and $\frac{n^2}{n^1+n^2} = 0.5 - 0.16$ by moles, where $n^1$=moles 1-vinyl-2-pyrrolidone and $n^2$=moles dialkyl maleate or fumarate.

Actually the minimum operable amount of dialkyl maleate or dialkyl fumarate is defined by a change in the properties of the copolymers. As the amount of 1-vinyl-2-pyrrolidone in a polymer system is increased to exceed the ratio of five moles of 1-vinyl-2-pyrrolidone to 1 mole of dialkyl maleate or dialkyl fumarate, the polymers tend to become water sensitive and hexane insoluble. It is to be noted that in my copending application Serial No. 680,036 filed as of even date, that such 1-vinyl-2-pyrrolidone dialkyl maleate or dialkyl fumarate copolymer are claimed as hexane-insoluble and water-soluble polymers.

The following examples will serve to illustrate how the various modified polymeric N-vinyl pyrrolidones having the foregoing desirable characteristics, are prepared. It is to be understood however, that these examples are merely illustrative and are not to be considered as being limitative of the invention disclosed and claimed.

EXAMPLE I

Into a three-necked, one-liter, Pyrex flask equipped with an Allihn condenser, a mechanical stirrer, a thermometer, and a nitrogen inlet tube was charged: 121.52 grams (0.35 mole) of di-2-ethyl-hexyl-maleate and 55.5 grams (0.50 mole) freshly distilled N-vinyl-2-pyrrolidone.

The two monomers were miscible and formed a clear solution. The flask was flushed with nitrogen and the inlet rate adjusted to about 30 bubbles per minute.

0.88 gram of 2,2'-azodiisobutyronitrile was added as catalyst. The flask was stirred for two minutes and the catalyst dissolved.

A steam bath was attached to the bottom of the flask and the steam was turned on. After two minutes the temperature rose to 85° C. at which point, the temperature began to rise rapidly. In fact the temperature rose to about 150–160° C. due to exothermic polymerization. The flask was cooled to 100° C. by means of a water bath. The flask was stirred and maintained at about 80° C. for three hours at which time the product was too viscous to stir. The final product was a pale amber, very viscous, tacky liquid soluble in hexane.

EXAMPLE II

Into a three-necked, one-liter, Pyrex flask equipped with a reflux condenser, a mechanical stirrer, a thermometer, and a nitrogen inlet tube was charged: 55.5 grams (0.5 mole) of distilled N-vinyl-2-pyrrolidone, 121.62 grams (0.36 mole) of di-2-ethyl-hexyl fumarate and 0.88 gram of 2,2'-azodiisobutyronitrile.

The flask was flushed with nitrogen and the inlet rate adjusted to about 30 bubbles per minute. After one minute of stirring the catalyst had dissolved and a clear solution was obtained. A steam bath was then connected and the temperature raised to 70° C. At about 76° C., an exothermic polymerization occurred and the temperature rose to about 160° C. The flask was cooled with a water bath to 80° C. Heating and stirring was continued for a total of six hours. The final product was a clear, sticky, very viscous slightly pinkish liquid soluble in hexane.

EXAMPLE III

Into a one-liter, three-necked, Pyrex flask equipped with a reflux condenser, a mechanical stirrer, a nitrogen inlet tube and a thermometer was charged: 45.6 grams of dibutyl maleate, 22.2 grams of distilled N-vinyl-2-pyrrolidone and 0.04 gram of 2,2'-azodiisobutyronitrile.

The flask was flushed with nitrogen and the inlet rate adjusted to about 30 bubbles per minute. The flask was then heated to 70° C. at which point the temperature rose spontaneously to 110° C. After cooling with a water bath to 70° C., the flask was again heated to maintain 70° C. for 18 hours.

The product obtained was a sticky, very viscous, light amber colored liquid soluble in hexane.

EXAMPLE IV

Into a three-necked, one-liter, Pyrex flask equipped with a reflux condenser, a mechanical stirrer, a thermometer, and a nitrogen inlet was charged: 22.2 grams of distilled N-vinyl-2-pyrrolidone, 45.6 grams of dibutyl fumarate and 0.39 gram of 2,2'-azodiisobutyronitrile.

The flask was flushed with nitrogen and the nitrogen inlet rate adjusted to about 30 bubbles per minute. The flask was then heated to 70° C. at which point the temperature rose spontaneously to 125° C. The flask was cooled with a water bath to 70° C. After this the flask was maintained at 70° C. for 12 hours.

The product obtained was a very viscous, tacky, gummy, pale amber colored liquid soluble in hexane.

EXAMPLE V

Into a three-necked, one-liter, Pyrex flask equipped with an Allihn reflux condenser, a mechanical stirrer, a thermometer, and a nitrogen inlet was charged: 24.6 grams of distilled N-vinyl-2-pyrrolidone, 75.4 grams of dioctyl maleate and 100.0 grams of hexane.

The flask was flushed with nitrogen and the inlet rate adjusted to about 30 bubbles per minute. The flask was heated to 60° C. for 30 minutes. Then 0.1 gram of lauroyl peroxide was added as the catalyst. After two hours after the catalyst was added viscosity began to increase. Total heating time was eight hours.

The final porduct was a viscous, light, yellow, clear solution.

EXAMPLE VI

Into a three-necked, one-liter, Pyrex flask equipped with a reflux condenser, a mechanical stirrer, a thermometer and a nitrogen inlet was charged: 20.0 grams of distilled N-vinyl-2-pyrrolidone, 80.0 grams of di-dodecyl maleate and 100.0 grams of hexane.

The flask was heated to 60° C. and 0.1 gram of 2,2'-azodiisobutyronitrile was added as the catalyst. Maintained at 60° C. for eight hours.

The final product was a light amber, very viscous, transparent solution.

EXAMPLE VII

This example is a collection of several experiments which were conducted to find the limits of these sticky, adhesive-like, viscous liquids:

| Exp. No. | Comonomer with VP | Mole ratio | Type of Material |
|---|---|---|---|
| 3162-199 | Diethyl maleate | 1:1 | Brittle resin. |
| 3563-165 | di-N-propyl maleate | 1:1 | White, dry, non-tacky material. |
| 3162-197 | Dibutyl maleate | 1:1 | Tacky, viscous liquid. |
| 3162-198 | Dibutyl fumarate | 1:1 | Do. |
| 3162-105 | di-2-ethyl hexyl maleate | 1:1.4 | Do. |
| 3162-118 | di-2-ethyl hexyl fumarate | 1:1.4 | Do. |
| 3563-69 | di-Dodecyl maleate | 1:1 | Do. |
| 3563-71 | Dioctadecyl maleate | 1:1 | Waxy solid. |
| 3162-200 | Dibenzyl maleate | 1:1 | Brittle resin. |
| 3162-201 | Dicyclohexyl maleate | 1:1 | Do. |

All of the above materials except 3162-105 and 118 were in equimolar quantities. 3162-105 and 118 were 1 mole of dialkyl maleate or fumarate to 1.4 moles of N-vinyl-2-pyrrolidone.

EXAMPLE VIII

A 40.3% hexane solution by weight of the polymer described in Example I (3162–105) was used to prepare a pressure-sensitive tape. The solution was cast onto cellophane with the aid of a doctor blade set to give a wet film of 0.008 inch. The solvent was evaporated leaving a tacky coating on the cellophane.

The pressure-senstive tape stuck readily to wood, paper, glass, and human skin.

EXAMPLE IX

A piece of urethane foam four inches long, two inches wide, and one inch thick was adhered to a wooden board by means of a copolymer containing N-vinyl-2-pyrrolidone and di-2-ethylhexyl maleate.

EXAMPLE X

A hexane solution of the polymer 3162–105 was used as an adhesive for Mylar, aluminum foil, kraft paper, waxed paper, Saran wrap and polyethylene. The substrates could be adhered to another sample of the same material or any of the materials listed.

EXAMPLE XI

Into a two-liter, four-necked resin pot equipped with a reflux condenser, a mechanical stirrer, a thermometer and a nitrogen inlet was charged: 111.0 grams of distilled N-vinyl-2-pyrrolidone, 386.0 grams of α-ethyl dioctyl maleate, 600.0 grams of hexane and 0.5 gram of 2,2′-azodiisobutyronitrile.

The flask was flushed with nitrogen and the inlet rate adjusted to about 30 bubbles per minute. The flask was then heated to 70° C. for 2 hours. After this was added 0.5 gram of 2,2′-azodiisobutyronitrile and heating and stirring was maintained for 5 hours. Total heating time was 8 hours.

The final product was a viscous, amber-colored, tacky liquid.

EXAMPLE XII

Into a four-necked, two-liter resin pot equipped with a reflux condenser, a mechanical stirrer, a thermometer and a nitrogen inlet was charged: 125.0 grams of N-vinyl-3-ethyl-2-pyrrolidone, 340.0 grams of di-2-ethyl hexyl maleate, 500.0 grams of hexane of 0.4 gram of 2,2′-azodiisobutyronitrile.

Flushed the flask with nitrogen and heated to 60° C. for 2 hours. After this added 0.3 gram of 2,2′-azodiisobutyronitrile catalyst, continued stirring and maintained at 68° C. for a total of 9 hours.

The final product was a viscous, sticky, light amber liquid.

I claim:

1. A water insoluble, tacky and flexible polymeric material adaptable as pressure sensitive adhesive characterized by the following general formula:

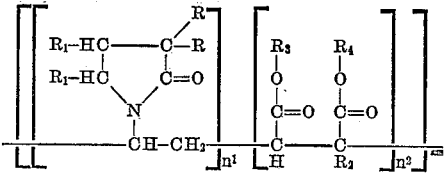

wherein R represents a member selected from the class consisting of hydrogen and methyl groups, $R_1$ represents a member selected from the class consisting of hydrogen, methyl and ethyl groups, $R_2$ represents a member selected from the class consisting of hydrogen and alkyl groups of from 1 to 3 carbon atoms, $R_3$ and $R_4$ represent an alkyl chain of from 3 to 14 carbon atoms, and wherein the ratio of $n^1/n^2$ ranges from 1 to 5.

2. A water insoluble, tacky and flexible polymeric material adaptable as pressure sensitive adhesive

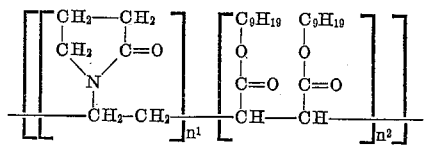

wherein the ratio of $n^1/n^2$ ranges from 1 to 5.

3. A water insoluble, tacky and flexible polymeric material having the following formula:

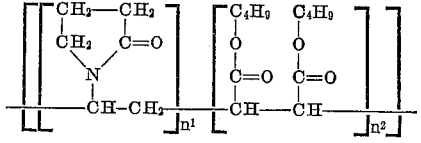

wherein the ratio of $n^1/n^2$ ranges from 1 to 5.

4. A water insoluble, tacky and flexible polymeric material having the following formula:

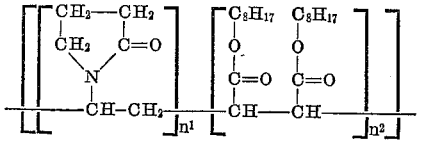

wherein the ratio of $n^1/n^2$ ranges from 1 to 5.

5. A water insoluble, tacky and flexible polymeric material adaptable as pressure sensitive adhesive

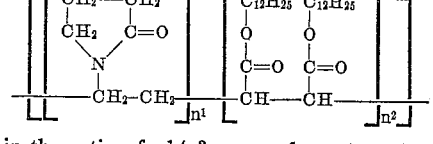

wherein the ratio of $n^1/n^2$ ranges from 1 to 5.

6. A water insoluble, tacky and flexible polymeric material adaptable as pressure sensitive adhesive having the following formula:

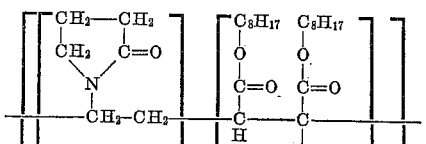

wherein the ratio of $n^1/n^2$ ranges from 1 to 5.

(References on following page)

References Cited in the file of this patent

UNITED STATES PATENTS

| | | | |
|---|---|---|---|
| 2,335,454 | Schuster et al. | Nov. 30, | 1943 |
| 2,471,951 | Hunt | May 31, | 1949 |
| 2,497,705 | Werntz | Feb. 14, | 1950 |
| 2,594,560 | Howard | Apr. 29, | 1952 |
| 2,667,473 | Morner | Jan. 26, | 1954 |
| 2,676,949 | Morner et al. | Apr. 27, | 1954 |
| 2,827,359 | Kine et al. | Mar. 18, | 1958 |
| 2,831,836 | Forchielli | June 16, | 1958 |

FOREIGN PATENTS

| | | | |
|---|---|---|---|
| 487,593 | Great Britain | June 22, | 1938 |

OTHER REFERENCES

Schildknecht: Vinyl & Related Polymers, Wiley (1952), p. 707.

UNITED STATES PATENT OFFICE
CERTIFICATION OF CORRECTION

Patent No. 2,999,853 September 12, 1961

William M. Perry

It is hereby certified that error appears in the above numbered patent requiring correction and that the said Letters Patent should read as corrected below.

Column 3, lines 46 and 47, for "copolymer" read -- copolymers --; column 6, lines 26 and 54, after "adhesive", each occurrence, insert -- having the following formula: --; same column 6, lines 36 and 45, before "having", each occurrence, insert -- adaptable as pressure sensitive adhesive --.

Signed and sealed this 10th day of April 1962.

(SEAL)
Attest:

ERNEST W. SWIDER
Attesting Officer

DAVID L. LADD
Commissioner of Patents